United States Patent
Kato et al.

(10) Patent No.: US 6,515,821 B2
(45) Date of Patent: *Feb. 4, 2003

(54) FLOPPY DISK DRIVE CONTROL APPARATUS CAPABLE OF ENSURING SEEK OPERATION USING A STEPPING MOTOR HAVING A LOW TORQUE

(75) Inventors: Masaki Kato, Obanazawa (JP); Hideaki Hayasaka, Yamagata (JP); Yoshihito Otomo, Yamagata (JP); Koichi Seno, Yamagata (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/021,858

(22) Filed: Dec. 4, 2001

(65) Prior Publication Data

US 2002/0054452 A1 May 9, 2002

Related U.S. Application Data

(62) Division of application No. 09/398,843, filed on Sep. 17, 1999, now Pat. No. 6,351,093.

(30) Foreign Application Priority Data

Sep. 24, 1998 (JP) ............................................ 98-269451

(51) Int. Cl.[7] .............................................. G11B 5/596
(52) U.S. Cl. .................................................. 360/78.13
(58) Field of Search .......................... 360/69, 75, 78.04, 360/78.11, 78.12, 78.13; 318/685, 696; 710/8, 22, 23, 27

(56) References Cited

U.S. PATENT DOCUMENTS

| | | | |
|---|---|---|---|
| 5,687,392 A | * 11/1997 | Radko | 395/842 |
| 5,774,743 A | 6/1998 | Story et al. | |
| 5,835,297 A | * 11/1998 | Moore et al. | 360/69 |
| 5,854,905 A | 12/1998 | Garney | |
| 5,913,072 A | 6/1999 | Wieringa | |
| 5,991,530 A | 11/1999 | Okada et al. | |
| 2001/0011316 A1 | * 8/2001 | Kubota | 710/129 |

* cited by examiner

Primary Examiner—Andrew L. Sniezek

(57) ABSTRACT

In an FDD control apparatus for controlling a floppy disk drive for driving a floppy disk loaded in the floppy disk drive, an FDD control part including a floppy disk controller (FDC) is disposed in an FDD side in lieu of a host side (a SET side). The host side (SET side) is loaded with a USB connector connected to the FDD control part. The FDD control part includes a flash ROM for storing a program for adjusting a step timing of a stepping motor.

8 Claims, 10 Drawing Sheets

|  | RESISTANCE OF STEPPING MOTOR ||
|  | HIGH | LOW |
| --- | --- | --- |
| TORQUE | LOW TORQUE | HIGH TORQUE |
| CONSUMED CURRENT | SMALL | LARGE |

FIG. 2

FLOPPY DISK DRIVE CONTROL APPARATUS CAPABLE OF ENSURING SEEK OPERATION USING A STEPPING MOTOR HAVING A LOW TORQUE

This application is a Division of application Ser. No. 09/398,843 filed Sep. 17, 1999, now U.S. Pat. No. 6,351, 093.

BACKGROUND OF THE INVENTION

This invention relates to a floppy disk drive control apparatus for controlling a floppy disk drive for driving a floppy disk loaded in the floppy disk drive.

In the manner known in the art, a floppy disk drive (which may be abbreviated to "FDD") is a device for carrying out data recording and reproducing operation to and from a magnetic recording medium of a floppy disk (which may be abbreviated to "FD") loaded therein. In addition, such a floppy disk drive is loaded in a portable electronic device such as a laptop personal computer, a notebook-size personal computer, a notebook-size word processor, or the like.

The floppy disk drive of the above-described type comprises a magnetic head for reading/writing data from/to the magnetic recording medium of the floppy disk, a carriage assembly for supporting the magnetic head at a tip thereof with the magnetic head movably along a predetermined radial direction to the floppy disk, a stepping motor for moving the carriage assembly along the predetermined radial direction, and a spindle motor for rotatably driving the magnetic recording medium with the floppy disk held.

Conventionally, control of the floppy disk is carried out by a host device such as a personal computer, a word processor, or the like. The host device is herein called the SET side, and a side of the floppy disk drive itself is herein called the FDD side.

In the manner which will later become clear, a conventional FDD control apparatus comprises a part loaded in the SET side and a part loaded in the FDD side. The SET side is loaded with a device driver and a floppy disk controller (FDC). On the other hand, the FDD side is loaded with an FDD controller connected to the floppy disk controller, a stepping motor driver for driving the stepping motor, a spindle motor driver for driving the spindle motor, and a reading/writing control circuit for controlling reading/writing of data via the magnetic head. The stepping motor drive, the spindle motor driver, and the reading/writing control circuit are connected to the FDD controller.

As described above, in the conventional FDD control apparatus, the control of the floppy disk drive is carried out by the SET side. As a result, a torque required for the stepping motor is determined by a control method of a seek operation (operation of the stepping motor) in the SET side. In other words, a step signal for driving the stepping motor is supplied from the SET side to the stepping motor. The step signal is a pulse signal comprising a train of pulses having a pulse period of a predetermined time interval which is equal to, for example, three milliseconds. Conversely, it is impossible for the floppy disk drive to fumble or deal with the pulse period of three milliseconds. Accordingly, in prior art, it is impossible to use a step signal having a pulse period which is longer than three milliseconds and it is impossible to decrease the torque of the stepping motor to less than the torque which is uniquely determined by three milliseconds. In addition, it is noted that the longer the pulse period of the step period becomes, the higher the torque of the stepping motor becomes.

When the stepping motor has a high resistance, a consumed current in the stepping motor decreases and the torque of the stepping motor decreases. As a result, in order to insure performance of the seek operation in the floppy disk drive, the resistance of the stepping motor has an upper limit level which is set to about 20 Ω. In addition, to increase the resistance of the stepping motor, for example, a thin winding may be used or the number of turns of a winding may be increased.

In other words, it is preferable that the consumed current in the stepping motor is small. However, when the stepping motor has a long torque, there is disadvantage in the manner which will presently be described.

Firstly, it is difficult to carry out operation on starting of the stepping motor. This is because, in the manner known in the art, a motor generally requires the highest torque on starting. Secondarily, it is difficult to carry out a seek operation in a state where the floppy disk is not loaded or inserted in the floppy disk drive in the manner which will later be described in conjunction with FIGS. 3A and 3B.

SUMMARY OF INVENTION

It is therefore an object of the present invention to provide a floppy disk drive apparatus which is capable of ensuring performance of a seek operation in a floppy disk drive even when the stepping motor has a low torque.

It is another object of the present invention to provide a floppy disk apparatus which is capable of reducing a consumed current in the stepping motor.

Other objects of the invention will become clear as the description proceeds.

The present inventors zealously studied how to ensure performance of a seek operation in the floppy disk drive even when the stepping motor has a low torque. As a result of their studies, the present inventors reached the conclusion that it is difficult to ensure performance of the seek operation in the floppy disk drive when the control part for controlling the floppy disk drive or the floppy disk controller (FDC) is loaded in the SET side in the manner of the conventional FDD control apparatus.

On describing the gist of this invention, it should be understood that a floppy disk drive control apparatus controls a floppy disk drive (FDD) for driving a floppy disk loaded in the floppy disk drive. The floppy disk drive control apparatus comprises a part loaded in a host side and a part loaded in an FDD side. According to this invention, a control part for controlling the floppy disk drive is disposed in the FDD side. That is, this invention is characterized in that the control part for the floppy disk drive is disposed in the FDD side whereas conventionally the control part for controlling the floppy disk drive is disposed in the host side or the SET side.

In the floppy disk drive control apparatus, the control part may include a floppy disk controller (FDC). In addition, inasmuch as the control part for the floppy disk drive is disposed in the FDD side, the host side preferably may be loaded with a connector called a universal serial bus (USB) connector that is connected to the control part. In the manner known in the art, the universal serial bus (USB) is a personal computer-oriented interface specification for connecting peripheral units. When the floppy disk drive comprises a stepping motor, the control part desirably may include a memory for storing a program for adjusting a step timing of the stepping motor.

BRIEF DESCRIPTION OF THE DRAWINGS

FIG. 2 is a view showing relationship between torque and a consumed current with respect to a resistance of a stepping motor;

DESCRIPTION OF THE PREFERRED EMBODIMENT

Figure 1:
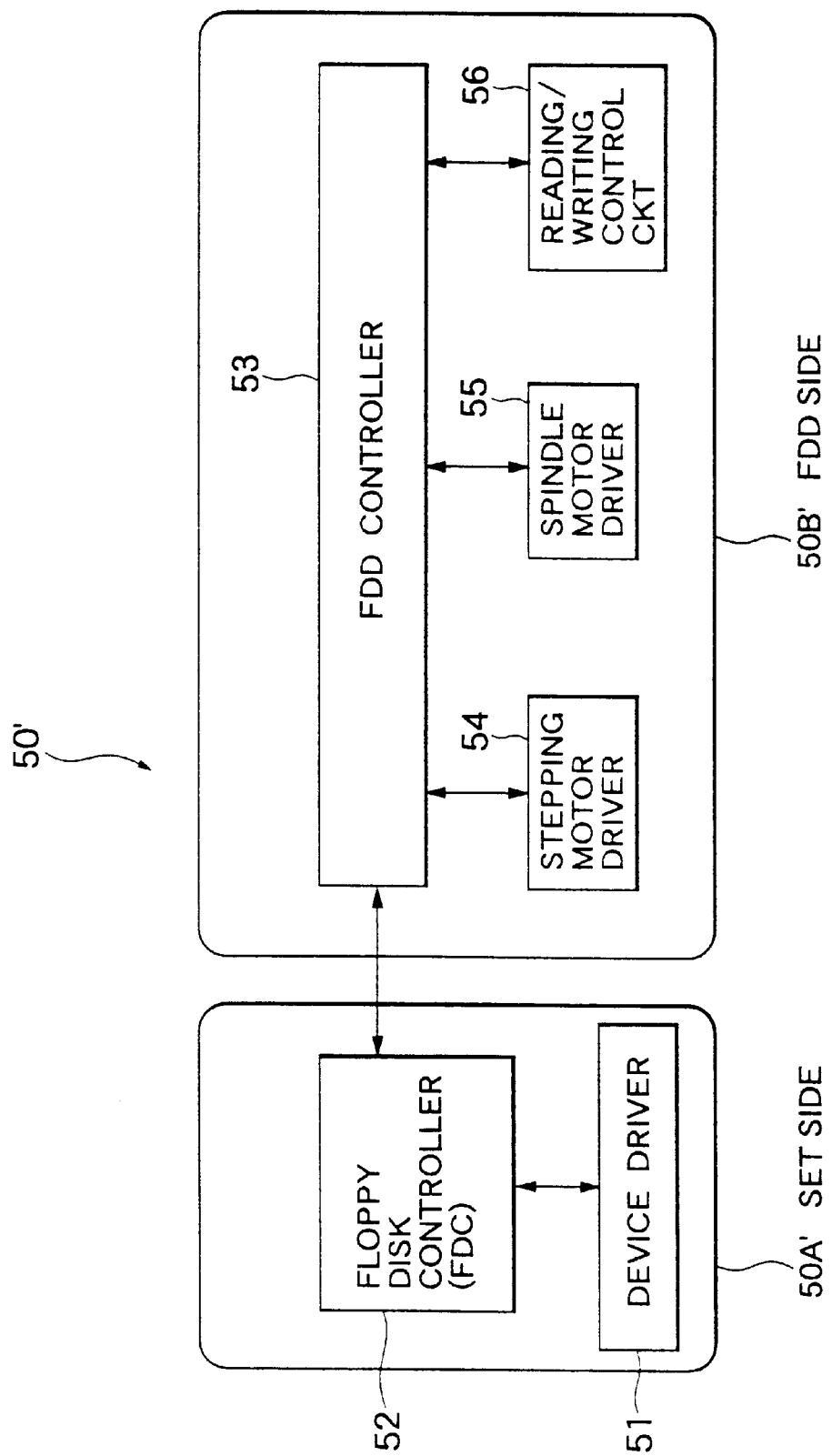
FIG. 1 is a block diagram of a conventional floppy disk drive control apparatus.

Referring to FIG. 1, a conventional FDD control apparatus 50' will be described at first in order to facilitate an understanding of the present invention. As illustrated in FIG. 1, the conventional FDD control apparatus 50' comprises a part loaded in a SET side 50A' and a part loaded in a FDD side 50B'.

The SET side 50A' is loaded with a device driver 51 and a floppy disk controller (FDC) 52. On the other hand, the FDD side 50B' is loaded with a FDD controller 53 connected to the floppy disk controller 52, a stepping motor driver 54 for driving a stepping motor (not shown), a spindle motor driver 55 for driving a spindle motor (not shown), and a reading/writing control circuit 56 for controlling reading/writing of data for a magnetic head art (not shown). The stepping motor driver 54, the spindle motor driver 55, and the reading/writing control circuit 56 are connected to the FDD controller 53.

As described above, in the conventional FDD control apparatus 50', control of a floppy disk drive (not shown) is carried out by the SET side 50A'. As a result, a torque required for the stepping motor is determined by a control method of a seek operation (operation of the stepping motor) in the SET side 50A'. In other words, a step signal for driving the stepping motor is supplied from the SET side 50A' to the stepping motor. The step signal is a pulse signal comprising a train of pulses having a pulse period of a predetermined time interval which is equal to, for example, three milliseconds. Conversely, it is impossible for the floppy disk drive to fumble or deal with the pulse period of three milliseconds. Accordingly, in the FDD control apparatus 50', it is impossible to use a step signal having a pulse period which is longer than three milliseconds and it is impossible to decrease the torque of the stepping motor to less than the torque which is uniquely determined by three milliseconds. In addition, it is noted that the longer the pulse period of the step signal becomes, the higher the torque of the stepping motor becomes.

Turning to FIG. 2, description will proceed to relationship between torque and a consumed current with respect to a resistance of the stepping motor.

As illustrated in FIG. 2, when the stepping motor has the high resistance, the consumed current in the stepping motor decreases and the torque of the stepping motor decreases. As a result, in order to ensure performance of a seek operation in the floppy disk drive, the resistance of stepping motor has an upper limit level which is set to about 20 Ω. In addition, to increase the resistance of the stepping motor, for example, a thin winding may be used, or the number of turns of a winding may be increased.

In other words, it is preferable that the consumed current in the stepping motor is small. However, when the stepping motor has a low torque, there is a disadvantage in the manner which will presently be described.

Firstly, it is difficult to carry out operation on starting of the stepping motor. This is because, in the manner known in the art, a motor generally requires the highest torque on starting.

Secondly, it is difficult to carry out a seek operation in a state where the floppy disk is loaded or inserted in the floppy disk drive in the manner which will presently be described.

Figure 3A:
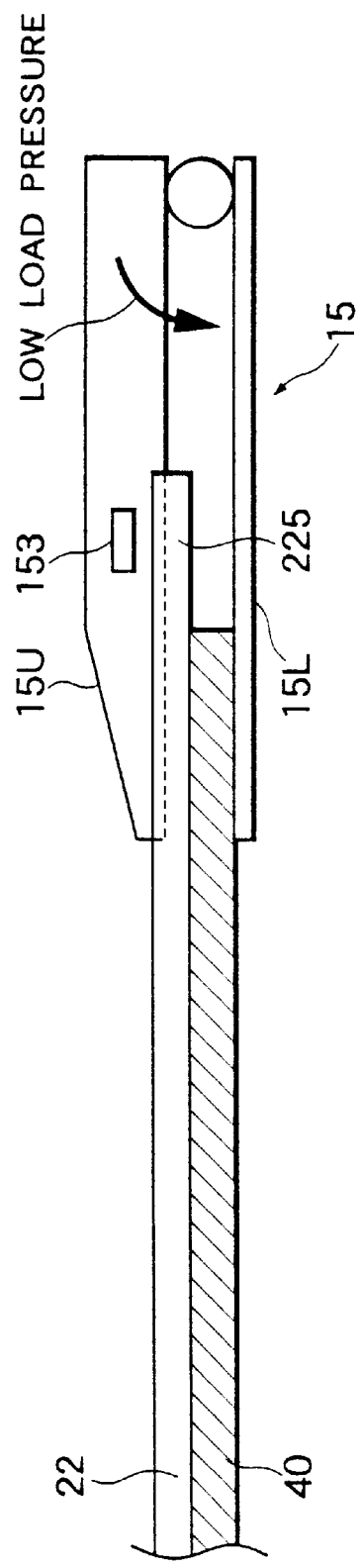
FIGS. 3A and 3B are schematic views for use in describing seek operation in a state where a floppy disk is not loaded in a floppy disk drive.
Figure 3B:
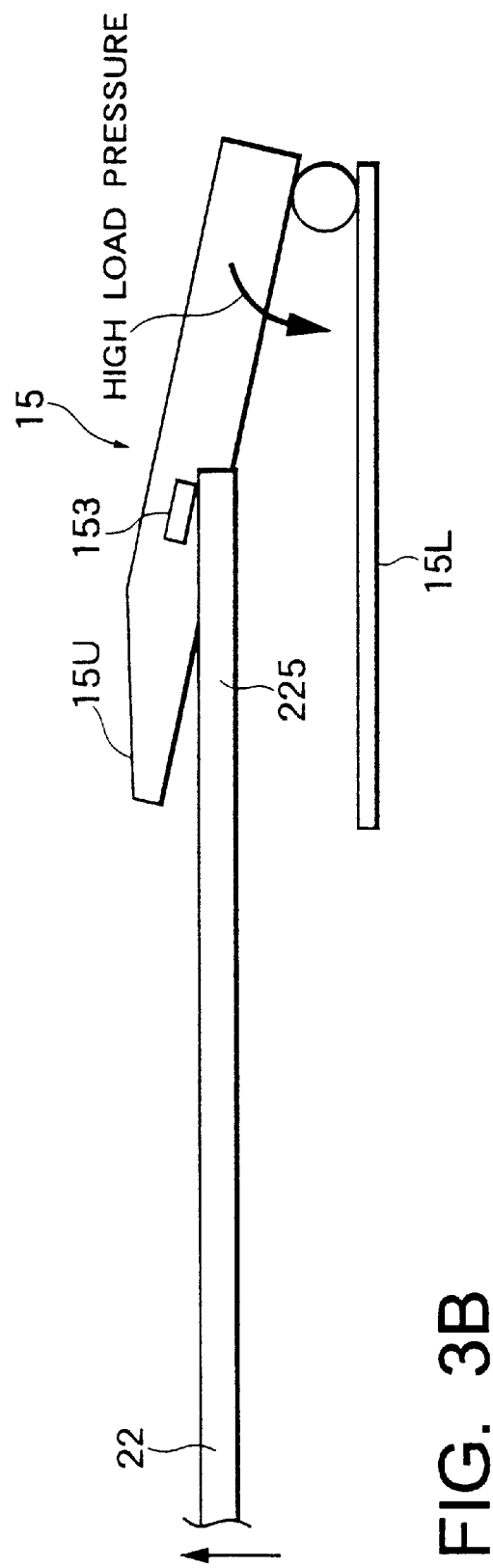

Referring now to FIGS. 3A and 3B, description will proceed to this reason. FIG. 3A shows a state where the floppy disk is loaded in the floppy disk drive while FIG. 3B shows a state where the floppy disk is not loaded in the floppy disk drive.

As illustrated in FIG. 3A, when the floppy disk depicted at 40 is loaded in the floppy disk drive, a disk holder 22 falls down and side arms 153 attached to an upper carriage 15U of a carriage assembly 15 are not engaged with a swelled portion 225 of the disk holder 22. In this event, a magnetic recording medium of the floppy disk 40 is put between a pair of magnetic heads (not shown). Accordingly, it is possible to sufficiently drive the stepping motor having the low torque. This is because the magnetic heads are pressed against the magnetic recording medium with a low spring pressure (which is called a load pressure) and a low load is applied to the carriage assembly 15.

It will be assumed that the floppy disk 40 is not loaded in the floppy disk drive as illustrated in FIG. 3B. Under the circumstances, the disk holder 22 moves upward in the manner depicted at an arrow and the disk holder 22 lifts up the upper carriage 15U of the carriage assembly 15. That is, the side arms 153 attached to the upper carriage 15U of the carriage assembly 16 are engaged with the swelled portion 225 of the disk holder 22. Accordingly, the load with a high pressure is applied to the carriage assembly 15. As a result, the stepping motor for driving the carriage assembly 15 is required to have a higher torque than that in a case where the floppy disk 40 is loaded in the floppy disk drive as illustrated in FIG. 3A.

Figure 4:
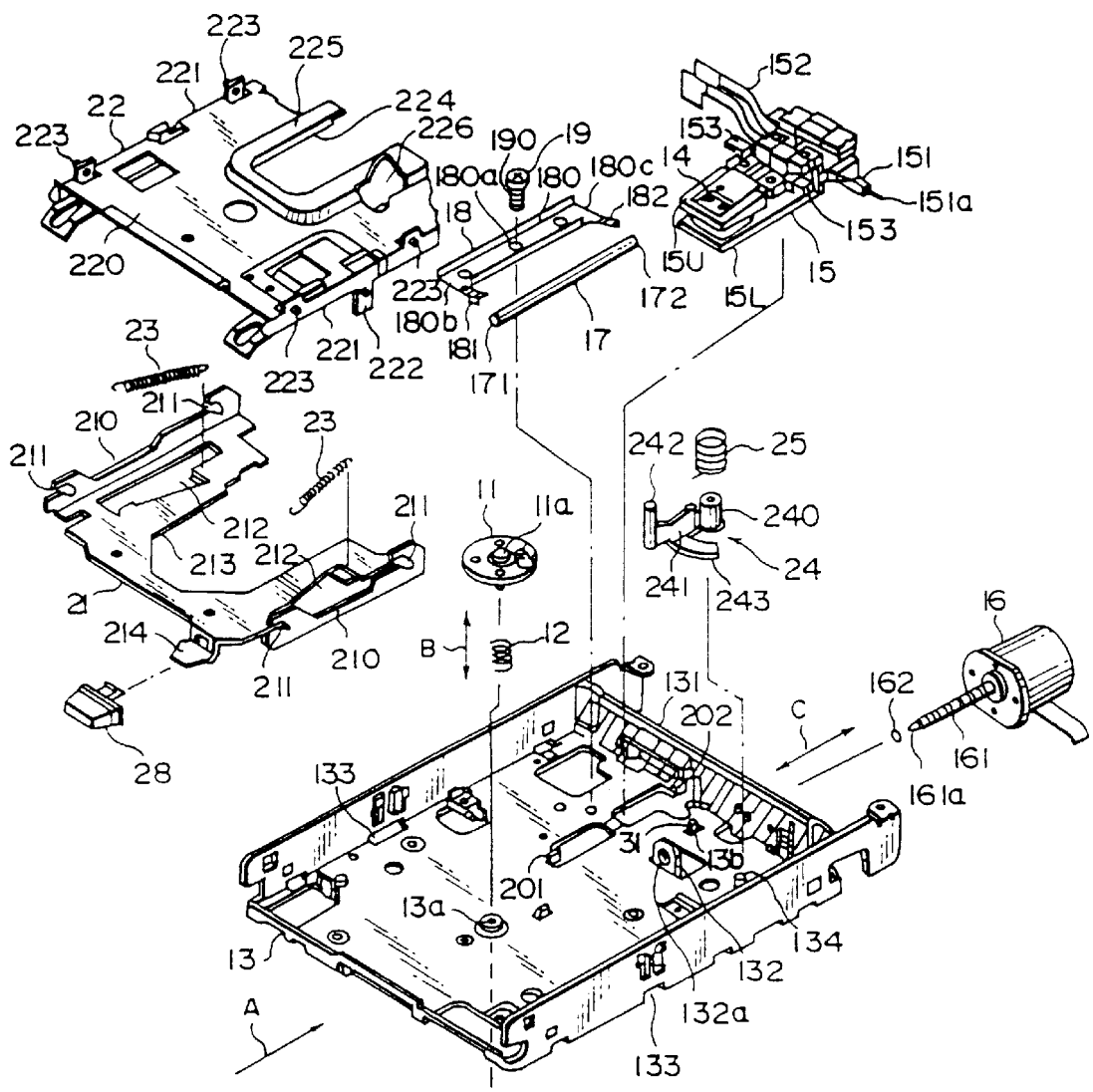
FIG. 4 is an exploded perspective view showing a main part of a floppy disk drive to which a floppy disk drive control apparatus according to this invention is applicable.
Figure 5:
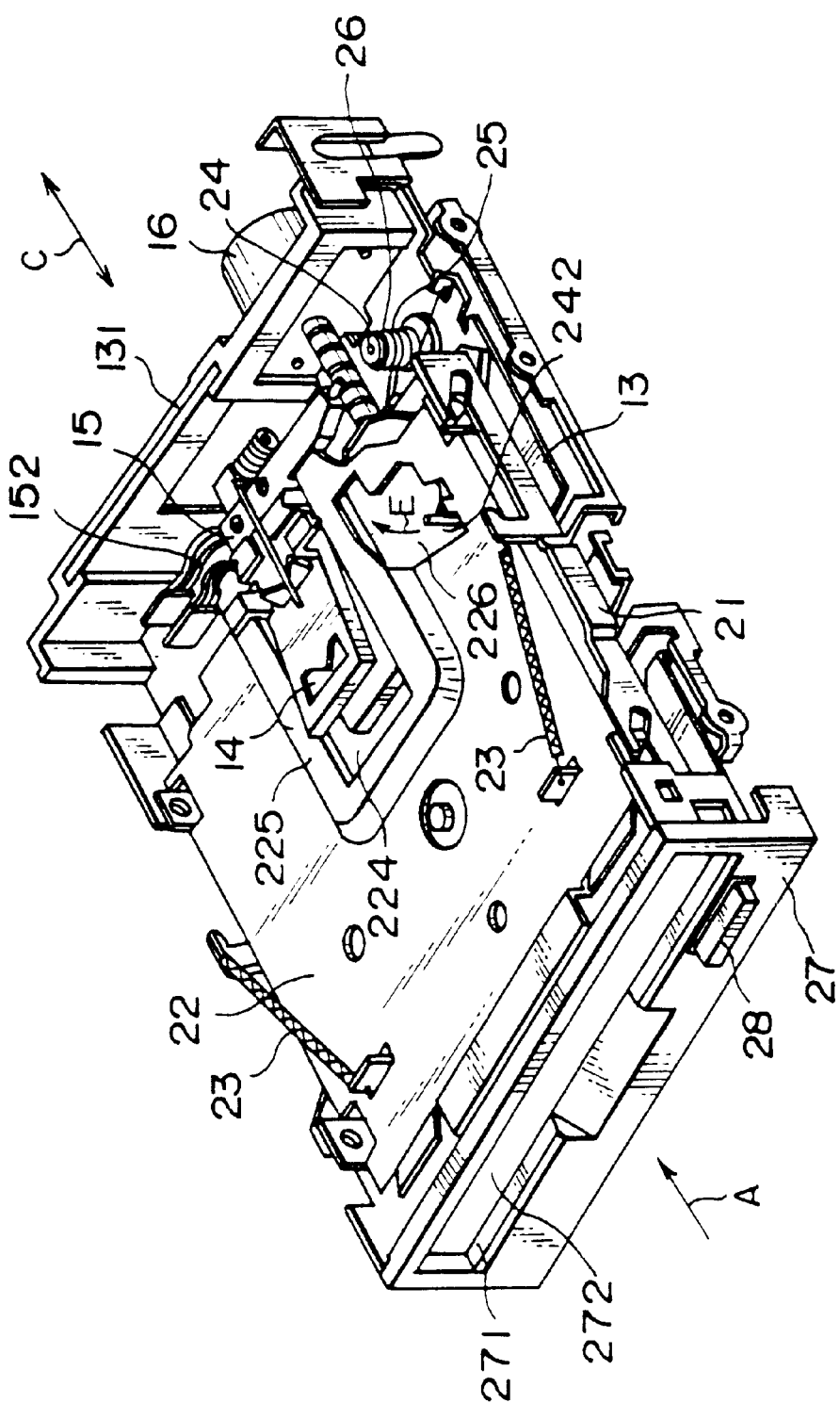
FIG. 5 is a schematic perspective view of the floppy disk drive illustrated in FIG. 4 as view from front obliquely.

Referring to FIGS. 4 and 5, the description will proceed to a floppy disk drive of a 3.5-inch type which is adapted to be loaded in a portable electronic equipment (not shown) and to which an FDD control apparatus according to this invention is applicable. FIG. 4 is an exploded perspective view of the floppy disk drive and FIG. 5 is a perspective view of the floppy disk drive viewing from a front side.

The illustrated floppy disk drive is a device for driving a floppy disk of a 3.5-inch type (which will later be described). The floppy disk is loaded in the floppy disk drive from a direction indicated by an arrow A on FIGS. 4 and 5. The loaded floppy disk is held on a disk table 11 having a rotation axis 11a. In this event, the rotation axis 11a coincides with a center axis of the floppy disk. The rotation axis 11a of the disk table 11 is inserted in a bearing 13a formed on a main frame 13 via a spring 12 and therefore the disk table 11 is rotatably supported on a main surface of the main frame 13. Accordingly, the rotation axis 11a of the disk table 11 has an axial direction B which extends in parallel with a thick direction of the main frame 13. The disk table 11 is rotatably driven by a spindle motor (not shown), which is mounted on a back surface of the main frame 13, thereby a magnetic recording medium of the flexible disk rotates. In addition, on the back surface of the main frame 13 is attached a main printed substrate (which will later become clear) on which a number of electronic parts (not shown) are mounted.

The floppy disk drive comprises a pair of upper and lower magnetic heads 14 (only the upper magnetic head is illustrated) for reading/writing data from/to the magnetic recording medium of the floppy disk. The magnetic heads 14 are supported in a carriage assembly 15 at a tip thereof that is laid in the floppy disk drive at a rear side. That is, the carriage assembly 15 comprises an upper carriage 15U for supporting the upper magnetic head 14 and a lower carriage 15L for supporting the lower magnetic head. The carriage assembly 15 is disposed over the main surface of the main frame 13 and is apart from the main frame 13 in the manner which will later be described. The carriage assembly 15 supports the magnetic heads 14 movably along a predetermined radial direction (i.e. a direction indicated by an arrow C in FIGS. 4 and 5) to the floppy disk.

In addition, the main frame 13 has at the rear side a side wall 131 on which a stepping motor 16 is fixed. The stepping motor 16 linearly drives the carriage assembly 15 along the predetermined radial direction C. More specifically, the stepping motor 16 has an axis of rotation (a driving shaft) 161 which extends in parallel with the predetermined radial direction C and which is threaded to form a male screw. The driving shaft 161 has a tip 161a which penetrates a hole 132a bored in a bent piece 132 and which is provided with a steel ball 162. The bent piece 132 is raised from the main surface of the main frame 13 by cutting and bending. By the hole 132a and the steel ball 152, a position of the driving shaft 161 is defined so as to extend in parallel with the predetermined radial direction C and the tip 161a is rotatable held.

On the other hand, the carriage assembly 15 comprises an arm 151 which extends from the lower carriage 15L to the driving shaft 161. The arm 151 has a leading go edge 151a which is bent so as engage with the root in the male screw of the driving shaft 161. Therefore, when the driving shaft 161 of the stepping motor 16 rotates, the leading edge 151a of the arm 151 moves along the root in the male screw of the driving shaft 161, thereby moving the carriage assembly 15 along the predetermined radial direction C. At any rate, the stepping motor 16 serves as a driving arrangement for moving the carriage assembly 15 along the predetermined radial direction C.

Inasmuch as the driving shaft 161 of the stepping motor 16 is disposed at one side of the carriage assembly 15, the one side of the carriage assembly 15 is movably supported by the driving shaft 161 and is apart from the main surface of the main frame 13. However, because support occurs by the driving shaft 161, it is difficult to dispose the whole of the carriage assembly 15 apart from the main surface of the frame 13. For this purpose, it is necessary to support and guide the carriage assembly 15 at another side thereof. To guide the carriage assembly 15 a guide bar 17 is provided. That is, the guide bar 17 is opposed to the driving shaft 161 of the stepping motor 16 with the carriage assembly 15 inserted between the guide bar 17 and the driving shaft 161. The guide bar 17 extends in parallel with the predetermined radial direction C and has one end 171 and another end 172 which are mounted on the main surface of the main frame 13 in the manner to be described later. The guide bar 17 guides the carriage assembly 15 along the predetermined radial direction C. As a result, the whole of the carriage assembly 15 is disposed from the main surface of the main frame 13.

In addition, a flexible printed circuit (FPC) 152 extends from the carriage assembly 15 to the vicinity of the guide bar 17 and the flexible printed circuit 152 are electrically connected to the main printed substrate attached to the back surface of the main frame 13.

The guide bar 17 is clamped on the main surface of the main frame 13 by a guide bar clamp 18. The guide bar clamp 18 is fixed on the main surface of the main frame 13 at a center portion thereof by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft 190 of the binding small screw 19 passes. The rectangular fixed member 180 has one end 180b and another end 180c from which a pair of arms 181 and 182 extend to clamp the one end 171 and the other end 172 of the guide bar 17 which the guide bar 17 sandwiched between the arms 181 and 182, respectively.

Inasmuch as the guide bar 18 merely clamps the guide bar 17, the guide bar 17 is not mounted on the main surface of the main frame 13 by the guide bar clamp 18 alone. For this purpose, a pair of locating members for locating the both ends 171 and 172 of the guide bar 17 is needed. As the pair of locating members, a pair of bent pieces 201 and 202 is used which are formed by cutting and bending parts of the main frame 13. At any rate, the pair of bent pieces 201 and 202 locate both ends 171 and 172 of the guide bar 17 to mount the guide bar 17 on the main surface of the main frame 13 in cooperation with the guide bar clamp 18.

The lower carriage 15L of the carriage assembly 15 serves as a supporting frame for supporting the carriage assembly 15 slidably along the guide bar 17. The lower carriage 15L has a projecting portion (not shown) which projects into the main surface of the main frame 13 at a side of the guide bar 17. The guide bar 17 is slidably fitted in the projection portion.

The flexible disk drive further comprises an eject plate 21 and a disk holder 22. Each of the main frame 13, the eject plate 21, and the disk holder 22 is formed to perform bending, press working, and bending of a metal plate.

The eject plate 21 is mounted on the main surface of the main frame 13 slidably along the insertion direction A of the floppy disk and an opposite direction. In the manner which will later become clear, the eject plate 21 holds, in cooperation with the disk holder 22, the flexible disk on operating of the floppy disk drive. In addition, the eject plate 21 holds the floppy disk slidably along in the insertion direction A so as to allow the floppy disk drive to load the floppy disk therein along the insertion direction A and to allow the floppy disk drive to eject the floppy disk therefrom along the opposite direction. The eject plate 21 comprises a pair of side walls 210 which are opposed to each other. Each of the side walls 210 has a pair of cam portions 211. In addition, the eject plate 21 has a bottom surface on which cut portions 212 are formed along the both side walls 210 and a U-shaped out portion 213 is formed at a center portion thereof so as to enclose the disk table 11. Furthermore, the eject plate 21 has a back surface on which a pin (not shown) is formed. The pin engages with a stop part of an eject lever which will later be described.

The disk holder 22 is disposed on the eject plate 21. The disk holder 22 comprises a principal surface 220 and a pair of side walls 221 which is formed at both side ends of the principal surface 220 and which is opposed to each other. The both side walls 221 have projection pieces 222 (only one is illustrated). The projection pieces 222 are inserted in bores 133 of the main frame 13 through the cut portions 212 of the eject plate 21. Inasmuch as the projection pieces 222 are inserted in the bores 133 of the main frame 13, the disk holder 22 is positioned against the main frame 13 in the insertion direction A and the disk holder 22 is reciprocated in the axial direction B of the rotation axis 11a of the disk table 11. Each of the both side walls 221 has a pair of pins 223. The pins 223 are inserted in the cam portions 211 formed in the side walls 210 of the eject plate 21. Between the disk holder 22 and the eject plate 21, eject springs 23 bridge.

Although the disk holder 22 is provided with the projection pieces 22 and the bores 133 are formed in the main frame 13 in the above-mentioned embodiment, restriction is not made to this and the main frame 13 may be provided with projection pieces and bores may be formed in the disk holder 22.

In addition, the disk holder 22 has a rectangular opening section 224 at a center portion in a back side in the insertion direction A. The rectangular opening section 224 is laid in a corresponding position of the upper carriage 15U of the carriage assembly 15 and extends in the predetermined radial direction C. So as to enclose the opening section 224, a U-shaped swelled portion 225 is formed where the principal surface 220 of the disk holder swells at periphery upwards. On the other hand, the carriage assembly 15 comprises a pair of side arms 153 which extends in a lateral direction perpendicular to a longitudinal direction of the carriage assembly 15. The side arms 153 are located on or over the swelled portion 225. In the manner which will be later described, in a state where the flexible disk is ejected from the disk holder 22, the side arms 153 engage with the swelled portion 225, thereby the pair of upper and lower magnetic heads 14 are apart from each other. In addition, the disk holder 22 has an additional opening section 226 at a right-hand side of the opening section 224 in the back side of the insertion direction A. The opening section 226 has a shape so as to allow a lever part of the eject lever (which will later be described) to rotatably move.

In the vicinity of the carriage assembly 15 on the main frame 13, the eject lever depicted at 24 is formed to rotatably move. More specifically, on the main frame 13, a rod pin 134 stands up which extends from the main surface thereof upwards. The eject lever 24 comprises a cylindrical part 240 in which the rod pin 134 is inserted, an arm part (the lever part) 241 extending from the cylindrical part 240 in a radial direction, a projection part 242 which is formed in the arm part 241 at a free end thereof and which extends upwards, and an arc-shaped stop part 243 which extends from a side of the free end of the arm part 241 in a circumferential direction. In the eject lever 24, an eject lever spring 25 is attached around the cylindrical part 240 and the eject lever spring 25 urges the eject lever 24 in a counterclockwise direction on a paper of FIG. 4. The projection part 242 of the eject lever 24 is freely fitted in the opening section 226 of the disk holder 22. The projection part 242 is engaged with an upper end of a right-hand side edge of a shutter in the flexible disk, that will later be described, to control opening and shutting of the shutter. In addition, as shown in FIG. 5, a screw 26 is thrust into a tip of the rod pin 134, thereby preventing the eject lever 24 from falling off the rod pin 134.

In addition, the main frame 13 has a front end section on which a front panel 27 is attached. The front panel 27 has an opening 271 for taking the floppy disk in and out and a door 272 for opening and shutting the opening 271. Into the front panel 27, an eject button 28 projects movably backward and forward. The eject button 28 is fitted in a protrusion part 214 which protrudes from a front end of the eject plate 21 forwards.

Figure 6:
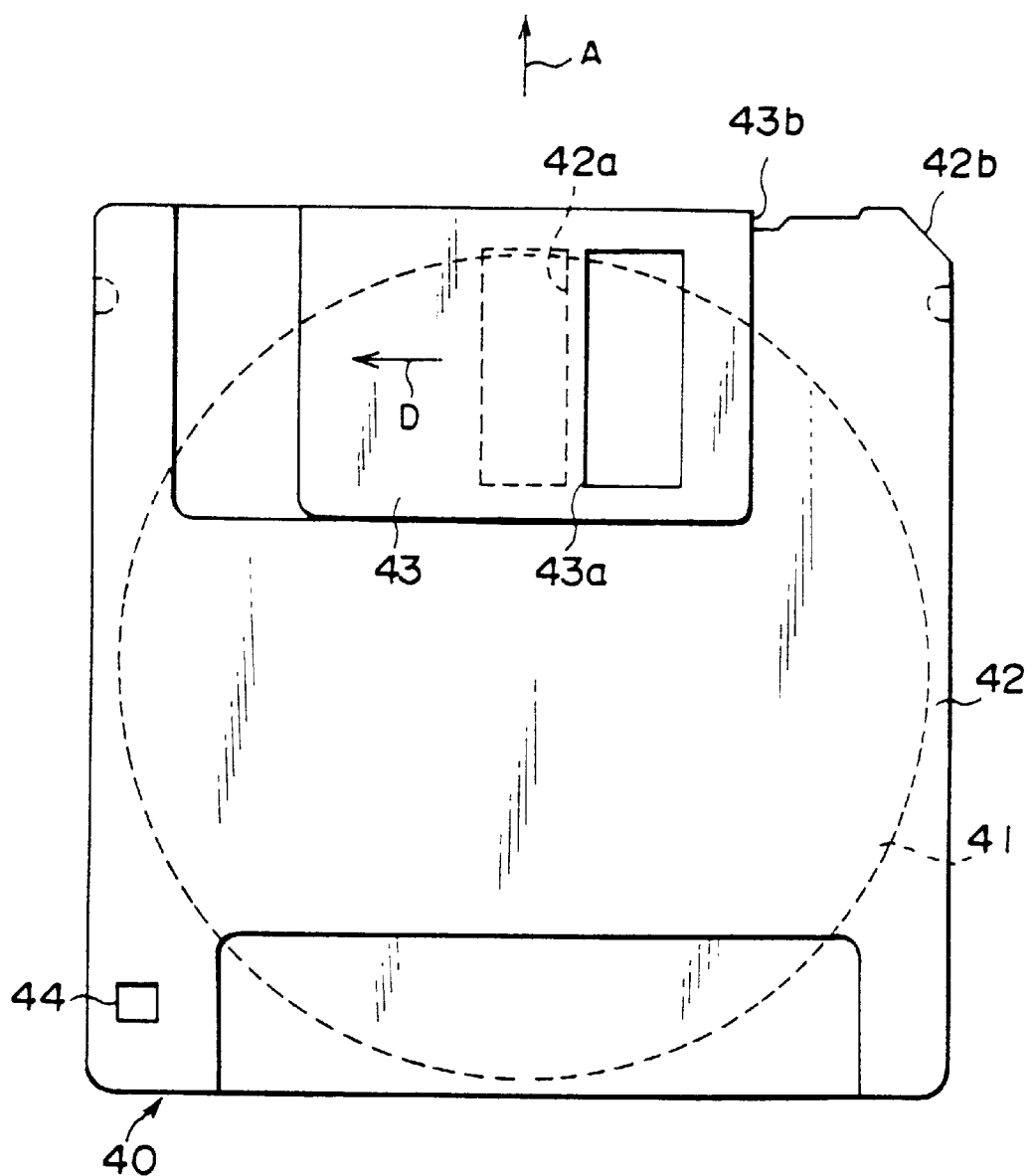
FIG. 6 is a plan view showing a floppy disk driven by the floppy disk drive.

Referring to FIG. 6, the description will proceed to the floppy disk (FD) driven by the floppy disk drive (FDD) illustrated in FIGS. 4 and 5. The illustrated floppy disk depicted at 40 comprises a disk-shaped magnetic recording medium 41, a shell 42 for covering or receiving the magnetic recording medium 41, and the shutter depicted at 43 slidably in a direction indicated by an arrow D in FIG. 6. The shutter 43 has a shutter window 43a. The shutter 43 is urged by a spring member (not shown) in a direction reverse to the direction D. The shell 42 has a head window 42a to enable an access of the magnetic recording medium 41 by the magnetic heads 14 (FIGS. 4 and 5) of the floppy disk drive.

In a state where the floppy disk 40 is not loaded in the floppy disk drive, the head window 43a is covered by the shutter 43 as shown in FIG. 6. When the floppy disk 40 is loaded in the floppy disk drive, the projection part 242 of the eject lever 24 (FIG. 4) engages with the upper end 43b of the right-hand side edge of the shutter 43 to slide the shutter 43 in the direction depicted at the arrow D.

The shell 42 has a chamfered portion 42b at a corner portion in upper and right-hand side. The chamfered portion 42b is for preventing reverse insertion (wrong insertion in a vertical direction or the insertion direction A). In addition, a write protection hole 44 is bored in the shell 42 at a corner portion in rear and left-hand side in the insertion direction A of FIG. 6.

As described above, in the floppy disk 40 driven by the floppy disk drive, the magnetic recording medium 41 accessed by the magnetic heads 14 (FIGS. 4 and 5) has a plurality of tracks on a surface thereof that serve as paths for recording data and that are formed in a concentric circle along a radial direction. The floppy disk 40 has eighty tracks on side which include the most outer circumference track (the most end track TR00 and the most inner circumference track TR79.

Figure 7:
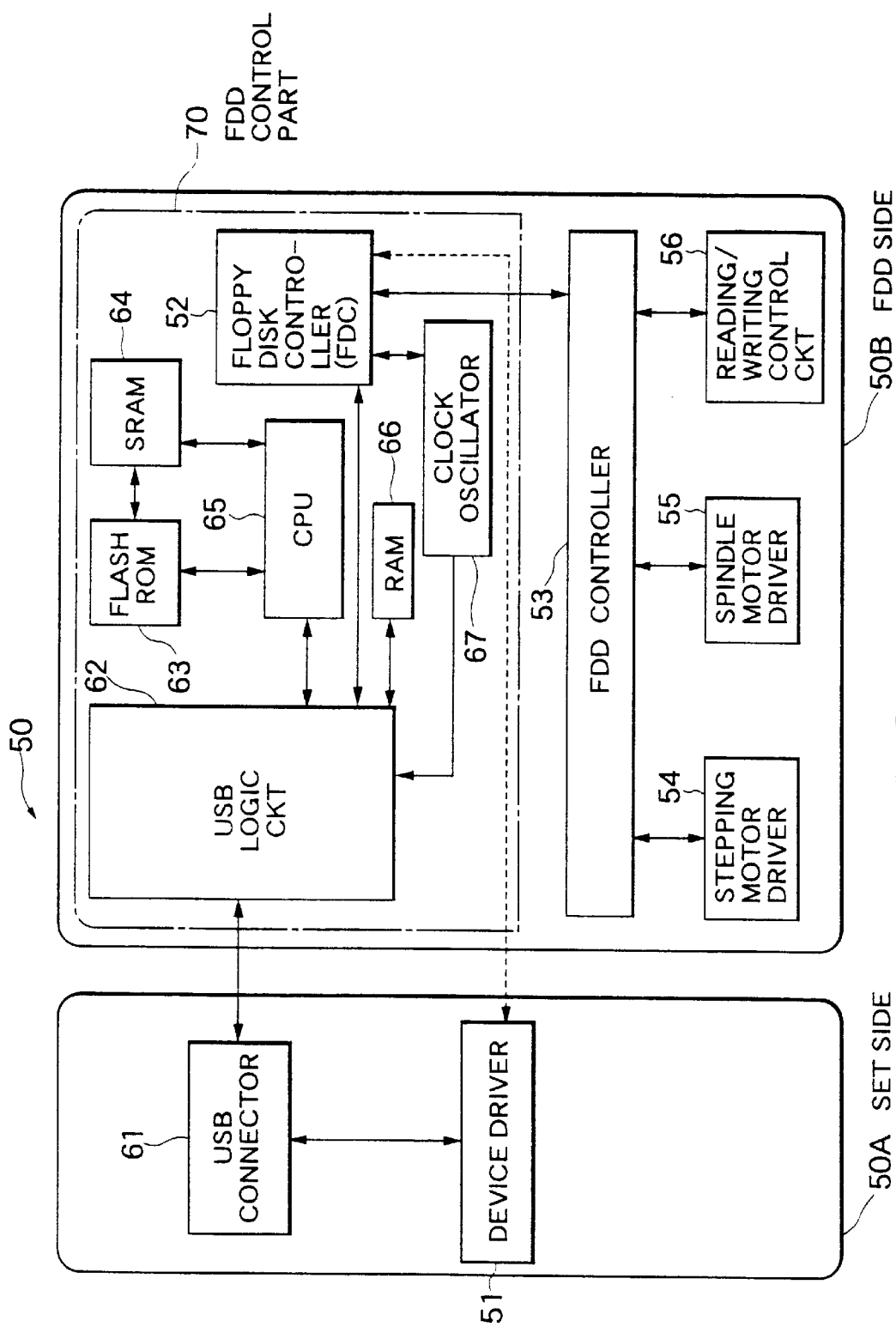
FIG. 7 is a block diagram of a floppy disk drive control apparatus according to an embodiment of this invention.

Referring to FIG. 7, the description will proceed to an FDD control apparatus 50 for controlling the floppy disk drive illustrated in FIGS. 4 and 5.

The illustrated FDD control apparatus 50 comprises a part loaded in a SET side 50A and a part loaded in a FDD side 50B in the manner which will become clear as the description proceeds. In the example being illustrated, the floppy disk controller (FDC) 52 is loaded in the FDD side 50B in lieu of the SET side 50A. Alternatively, the SET side 50A is loaded with a USB connector 61. The floppy disk controller 52 is connected to the device driver 51 loaded in the SET side 50A.

The FDD side 50B is loaded not only with the floppy disk controller 52, the FDD controller 53, the stepping motor driver 54, the spindle motor driver 55, and the reading/writing control circuit 56 but also with a USB logic circuit 62, a flash read only memory (RON) 63, a static random access memory (SRAM) 64, a central processing unit (CPU) 65, a random access memory (RAM) 66, and a clock oscillator (CLK) 67. A combination of the floppy disk controller 52, the USB logic circuit 62, the flash read only memory (ROM) 63, the static random access memory (SRAM) 64, the central processing unit 65, the random access memory 66, and the clock oscillator 67 serves as a FDD control part 70.

The FDD controller 53 is connected to the stepping motor driver 54, the spindle motor driver 55, and the reading/writing control circuit 56. The USB logic circuit 62 is connected to the USB connector 61 loaded in the SET side 50A. In addition, the USB logic circuit 62 is connected to the central processing unit 65, the floppy disk controller 52, the random access memory 66, and the clock oscillator 67. The central processing unit 65 is connected to the flash read only memory 63 and the static random access memory 64. The floppy disk controller 52 is connected to the FDD controller 53 and the clock oscillator 67.

As described above, in this embodiment, the FDD control part 70 is disposed in the FDD side 50B by using the USB connector 61. The flash read only memory 63 of the FDD control part 70 stores a program for adjusting a stop timing for the stepping motor 16 (FIGS. 4 and 5). Accordingly, in the manner which will presently be described, it is possible to change a pulse period of a step signal STEP for driving the stepping motor 16 and to decrease torque of the stepping motor 16.

Figure 8:
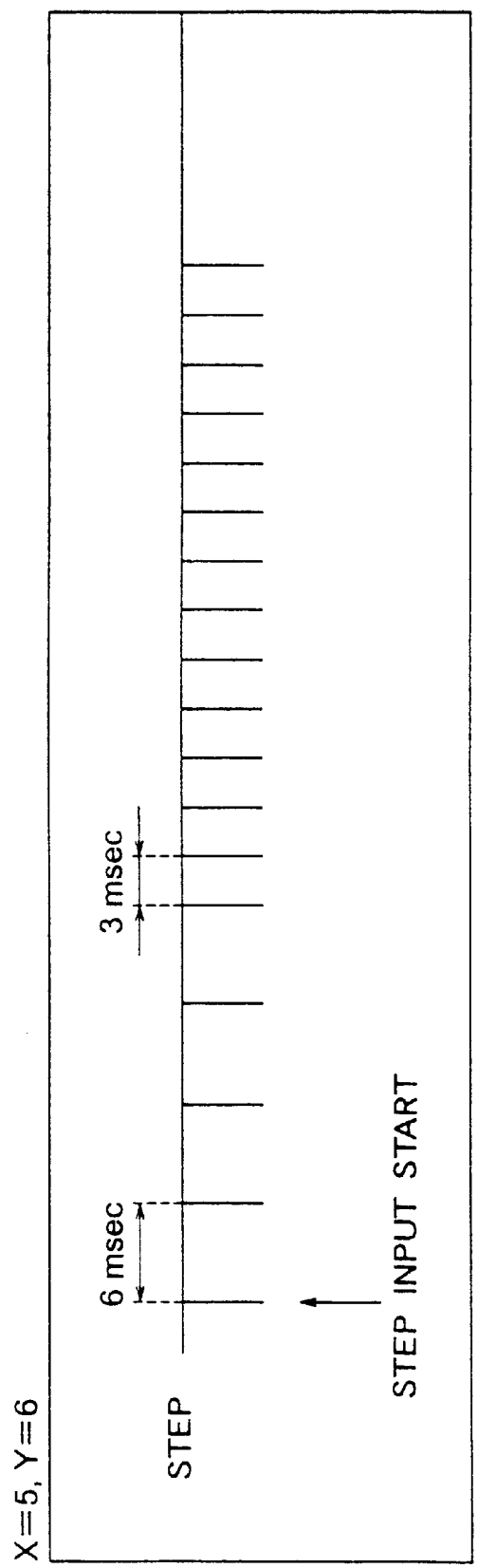
FIG. 8 is a time chart for use in describing operation on starting of a stepping motor by means of the floppy disk drive control apparatus illustrated in FIG. 7.

Referring now to FIG. 8, description will be made as regards operation on starting of the stepping motor 16 (FIGS. 4 and 5) by means of the FDD control apparatus 50 illustrated in FIG. 7.

As shown in FIG. 8, the FDD control part 70 produces the step signal STEP having a predetermined pulse period of three milliseconds during a normal operation state except on starting of the stepping motor 16. On starting of the stepping motor 16, the FDD control part 70 produces, during initial X steps, the step signal STEP having a specific pulse period of Y milliseconds, where X represents a first positive number which is not less than one and Y represents a second positive number which is more than three. In the example being illustrated in FIG. 8, the first positive number X is equal to five and the second positive number Y is equal to six. The first positive number X preferably may lie in a range between one and twenty, both inclusive, namely, $$1 \leq X \leq 20.$$

In addition, the second positive number Y preferably may lie in a range between three, exclusive, and six, inclusive, namely, $$3 < Y \leq 6.$$

Inasmuch as the step signal STEP has the specific pulse period which is longer than the predetermined pulse period of three milliseconds on starting of the stepping motor 16, it is possible to easily operate the stepping motor 16 on starting of the stepping motor 16.

Figure 9:
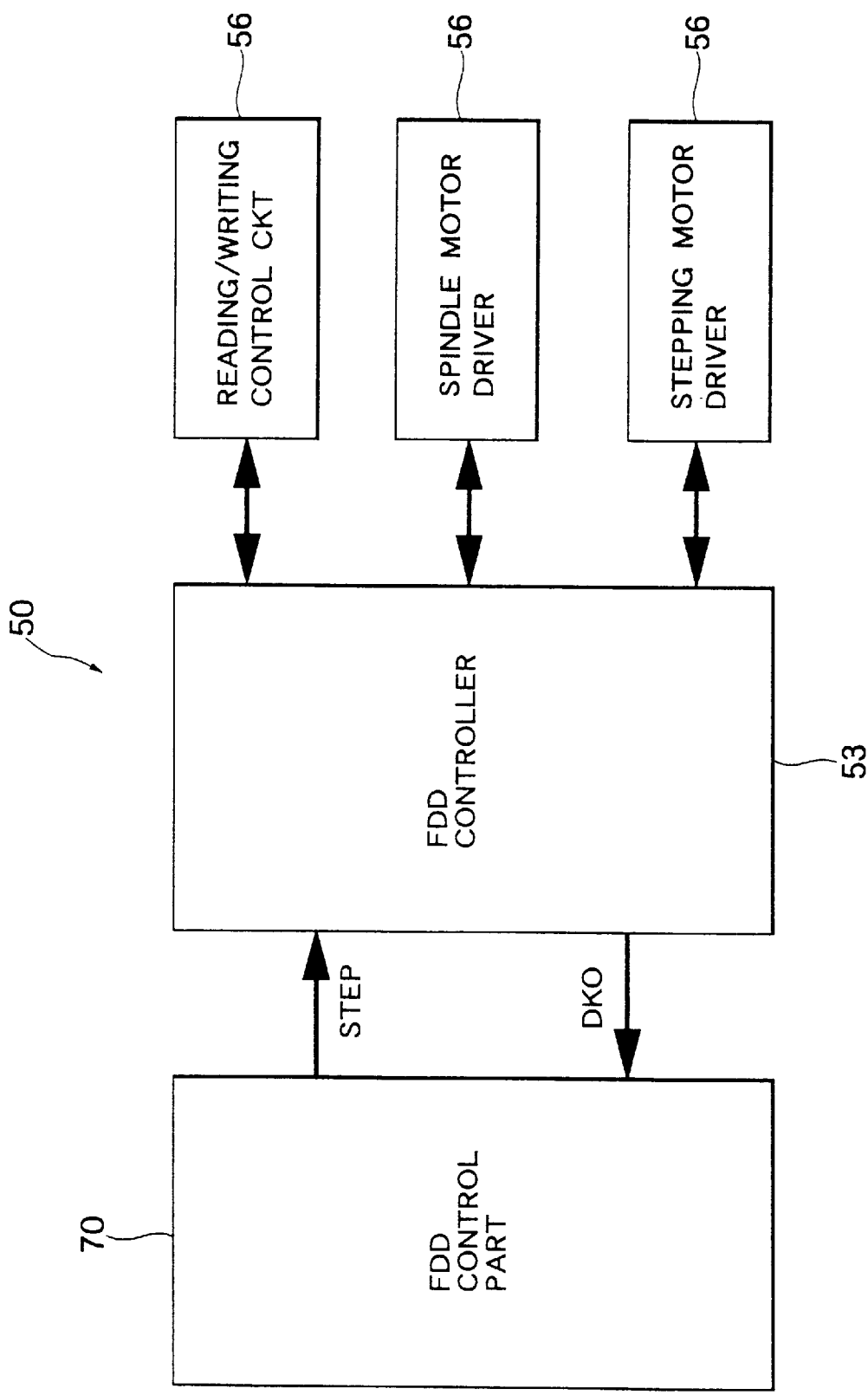
FIG. 9 is a block diagram for use in describing operation on seek operation of a floppy disk drive by means of the floppy disk drive control apparatus illustrated in FIG. 7.
Figure 10:
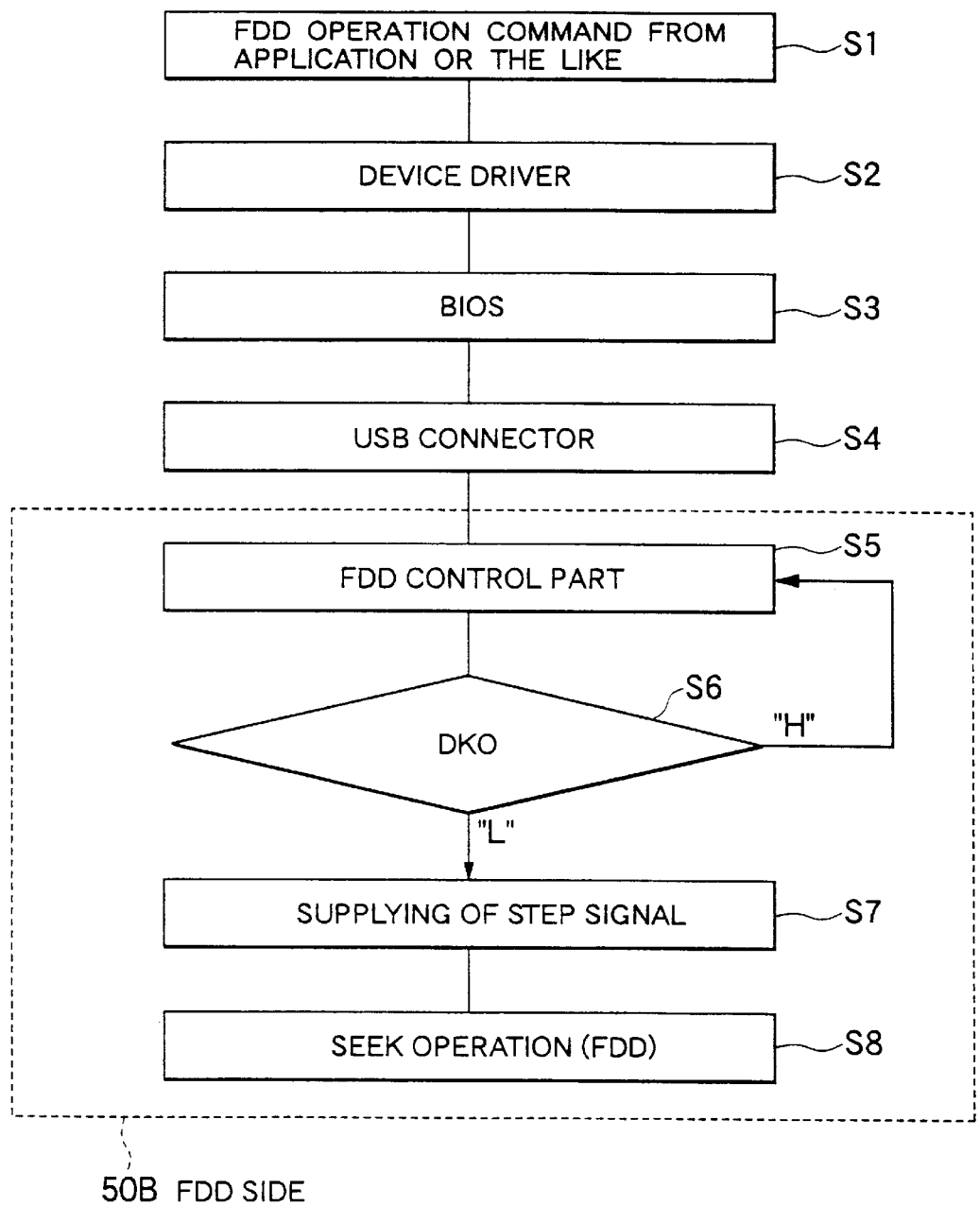
FIG. 10 is a flow chart for use in describing operation on seek operation of a floppy disk drive by means of the floppy disk drive control apparatus illustrated in FIG. 7.

Referring now to FIGS. 9 and 10, description will be made as regards operation, by means of the FDD control apparatus 50 illustrated in FIG. 7, for controlling the stepping motor 16 so as to do not operate in a state where the floppy disk 40 (FIG. 6) is not loaded in the floppy disk drive illustrated in FIGS. 4 and 5.

As shown in FIG. 9, the FDD controller 53 sends, to the FDD control part 70, a disk presence or absence distinction signal DKO indicating whether or not the floppy disk 40 is present in the floppy disk drive. When the floppy disk 40 is loaded or inserted in the floppy disk drive, the FDD controller 53 produces the disk presence or absence distinction signal DKO of a logic "L" level indicative of presence of the floppy disk 40. On the other hand, when the floppy disk 40 is not loaded or inserted in the floppy disk drive, the FDD controller 53 produces the disk presence or absence distinction signal DKO of a logic "H" level indicative of absence of the floppy disk 40. When the disk presence or absence distinction signal DKO has the logic "H" level, the FDD control part 70 does not supply the step signal STEP to the FDD controller 53.

Referring to FIG. 10, description will be made with respect to operation in greater detail. To start with, an FDD operation command is supplied to the SET side 50A from an application program (not shown) or the like at a step S1. The step S1 is followed by a step S2 at which the device driver 51 receives the FDD operation command. The device driver 51 sends the FDD operation command via a basic input/output system (BIOS) and the USB connector 61 (steps S3 and S4) to the FDD control part 70 (step S5).

The BIOS is a control program dependent on hardware in an operating system (OS). That is, a recent OS, particularly an OS for a personal computer is made by dividing a part for controlling the hardware and other parts into separate modules so that a common OS enable to operate on different hardware. The part for controlling the hardware is called BIOS.

The FDD control part 70 determines whether the disk presence or absence distinction signal DKO has the logic "H" level or the logic "L" level at a step S6. While the disk presence or absence distinction signal DKO has the logic "H" level, the FDD control part 70 carries out no operation. When the disk presence or absence distinction signal DKO has the logic "L" level, the step S6 is succeeded by a step S7 at which the FDD control part 70 supplies the step signal STEP to the FDD controller 53. Responsive to the step signal STEP, the FDD controller 53 operates the stepping motor 16 to make the stepping motor 16 carry out a seek operation for the floppy disk drive (step S8).

Inasmuch as the FDD control part 70 does not supply the step signal STEP to the FDD controller when the floppy disk 40 is not loaded or inserted in the floppy disk drive, it is possible to secure performance of the seek operation of the floppy disk drive even when the stepping motor 16 has a low torque.

While this invention has thus far been described in conjunction with a preferred embodiment thereof, it is to be understood that modifications will be apparent to those skilled in the art without departing from the spirit of the invention.

What is claimed is:

1. A floppy disk drive for driving a floppy disk loaded in said floppy disk drive, wherein said floppy disk comprises a magnetic recording medium, said floppy disk drive comprising:
   a magnetic head that reads/writes data from/to the magnetic recording medium of said floppy disk;
   a carriage assembly that supports said magnetic head;
   a stepping motor that linearly drives said carriage assembly;
   a spindle motor that rotatably drives the magnetic recording medium of said floppy disk;
   a stepping motor driver that drives said stepping motor;
   a spindle motor driver that drives said spindle motor;
   a reading/writing control circuit that controls reading/writing of data from/to said magnetic head;
   a floppy disk drive controller that controls said stepping motor driver, said spindle motor driver, and said reading/writing control circuit; and
   a floppy disk drive control part that controls said floppy disk drive controller by supplying to said floppy disk drive controller a step signal for driving said stepping motor;

wherein said floppy disk drive controller sends to said floppy disk drive control part a disk presence/absence distinction signal indicating whether or not said floppy disk is present in said floppy disk drive, and said floppy disk drive control part does not supply said step signal to said floppy disk drive controller when the disk presence/absence distinction signal indicates an absence of said floppy disk.

2. The floppy disk drive as claimed in claim 1, wherein said floppy disk drive control part also comprises a floppy disk controller.

3. The floppy disk drive as claimed in claim 1, wherein said floppy disk drive is adapted to be connected to a host computer, and said host computer comprises a universal serial bus connector connected to said floppy disk drive control part.

4. The floppy disk drive as claimed in claim 1, wherein said floppy disk drive control part includes a memory storing a program adapted to adjust a step timing of said stepping motor.

5. The floppy disk drive as claimed in claim 4, wherein the step signal is produced by said floppy disk drive control part so as to have a predetermined pulse period during a normal operation state except on starting of said stepping motor, and wherein on starting of said stepping motor the step signal is produced by said floppy disk drive control part so as to have a specific pulse period longer than the predetermined pulse period.

6. The floppy disk drive as claimed in claim 5, wherein said predetermined pulse period is equal to three milliseconds, said specific pulse period is Y milliseconds, and said floppy disk control part produces the step signal so as to have the specific pulse period during an initial X steps on starting of said stepping motor, where X represents a first positive number which is not less than one and Y represents a second positive number which is more than three.

7. The floppy disk drive as claimed in claim 6, wherein the first positive number X lies in a range between one and twenty, inclusive, and the second positive number Y lies in a range from three, exclusive, to six, inclusive.

8. The floppy disk drive as claimed in claim 7, wherein the first positive number X is equal to five and the second positive number Y is equal to six.

* * * * *